US006810567B2

(12) United States Patent
Markhoff et al.

(10) Patent No.: US 6,810,567 B2
(45) Date of Patent: Nov. 2, 2004

(54) PARTIAL OR COMPLETE UTILIZATION OF A PRESSURIZED-GAS CYLINDER KNOWN PER SE FOR COMPRESSED, LIQUEFIED OR DISSOLVED GASES

(75) Inventors: Klaus Markhoff, Kempen (DE); Martin Kesten, Rosrath (DE)

(73) Assignee: Messer Griesheim GmbH (DE)

( * ) Notice: Subject to any disclaimer, the term of this patent is extended or adjusted under 35 U.S.C. 154(b) by 71 days.

(21) Appl. No.: 10/067,499

(22) Filed: Feb. 5, 2002

(65) Prior Publication Data

US 2002/0070222 A1 Jun. 13, 2002

Related U.S. Application Data

(62) Division of application No. 09/403,359, filed as application No. PCT/EP98/02603 on May 2, 1998, now Pat. No. 6,363,597.

(30) Foreign Application Priority Data

May 20, 1997 (DE) ........................................ 197 21 128

(51) Int. Cl.[7] ................................................ B23P 23/00

(52) U.S. Cl. .................. 29/401.1; 29/402.01; 29/403.1; 220/561; 220/586; 220/592

(58) Field of Search .............. 29/401.1, 402.01–402.09, 29/403.1, 888.011, 888.021, 801; 220/561, 560.04, 581, 584, 585, 586, 588, 591, 592, 62.19; 409/143, 132, 199; 451/48, 51, 120

(56) References Cited

U.S. PATENT DOCUMENTS

| | | | | | |
|---|---|---|---|---|---|
| 2,337,058 | A | * | 12/1943 | McKee | 228/119 |
| 3,210,228 | A | * | 10/1965 | Bluck | 156/172 |
| 3,843,010 | A | * | 10/1974 | Morse et al. | 220/590 |
| 3,969,812 | A | * | 7/1976 | Beck | 29/421.1 |
| 4,227,292 | A | * | 10/1980 | Kipling | 29/402.4 |
| 4,486,938 | A | * | 12/1984 | Hext | 29/402.06 |
| 4,589,562 | A | * | 5/1986 | Fawley | 220/590 |
| 4,699,288 | A | * | 10/1987 | Mohan | 220/590 |
| 4,835,975 | A | * | 6/1989 | Windecker | 62/45.1 |
| 5,518,141 | A | * | 5/1996 | Newhouse et al. | 220/586 |

* cited by examiner

*Primary Examiner*—David P. Bryant
*Assistant Examiner*—Stephen Kenny

(57) ABSTRACT

The invention relates to the partial or complete use of a pressurized gas cylinder known per se for compressed, liquefied or dissolved gases as a liner for a composite cylinder. This enables production costs of a composite cylinder to be reduced by ⅓ when compared to the costs arising from the production of a new composite cylinder using current manufacturing technologies.

11 Claims, 1 Drawing Sheet

PARTIAL OR COMPLETE UTILIZATION OF A PRESSURIZED-GAS CYLINDER KNOWN PER SE FOR COMPRESSED, LIQUEFIED OR DISSOLVED GASES

CROSS REFERENCE TO RELATED APPLICATION

This application is a division of application Ser. No. 09/403,359, filed Feb. 18, 2000, which is now issued U.S. Pat. No. 6,363,597, which is a 371 of Application Ser. No. PCT/EP98/02603 filed May 2, 1998.

BACKGROUND OF THE INVENTION

The invention relates to the partial or complete utilization of a pressurized-gas cylinder known per se for compressed, liquefied or dissolved gases.

Gases and gas mixtures are generally stored and transported in pressurized-gas containers. According to the German ordinance on pressure vessels, these are containers in which an overpressure greater than 1 bar can be produced at 15° C. Information on the status of safety technology with respect to material, production, calculation, equipment, labeling, testing and operation of the pressurized-gas containers, and on construction, testing and operation of the filling plants, is given by the German codes of practice for pressurized gases (TRG). The TRG differentiate between gases and gas mixtures according to their chemical and physical behavior and establish the pressurized-gas containers to be used, including their equipment components, their test intervals, the filling factors and filling pressures.

The most usual pressurized-gas containers are pressurized-gas cylinders of steel and aluminum for compressed, liquefied or dissolved gases having a maximum filling pressure up to 200 bar. Increasingly, the users are demanding pressurized-gas containers having a maximum filling pressure up to 300 bar. These 300 bar pressurized-gas containers are likewise fabricated from steel or aluminum. For special applications, corrosion-resistant stainless steel (DE 37 36 579 A1) is also used.

To decrease the weight of such 300 bar pressurized-gas cylinders, composite gas cylinders (composite cylinders) are recently being used by the gas producers. Composite gas cylinders consist of a seamless metal liner which is wrapped over an important part of its length with composite fibers of glass, carbon, aramid or wire. Aramid is taken to mean organic fibers of poly(phenylene terephthalamide), which include Kevlar and Twaron. Aramid and carbon fibers are lighter than glass fibers, with identical or better strength properties and good impact strength.

Composite gas cylinders of this type are expensive to produce. In addition, there is the fact that, with the charging of all of the gas types which are currently technically possible into 300 bar pressurized-gas cylinders, there is a high potential for disposal of used 200 bar pressurized-gas cylinders.

SUMMARY OF INVENTION

The object underlying the invention is to provide a composite gas cylinder which can be produced considerably more cheaply.

In accordance with this invention a composite cylinder comprises a liner wrapped over a substantial part of its length with composite fibers, and the liner is a pressurized-gas cylinder for compressed, liquefied or dissolved gases, which is currently in circulation.

DETAILED DESCRIPTION

Figure 1:
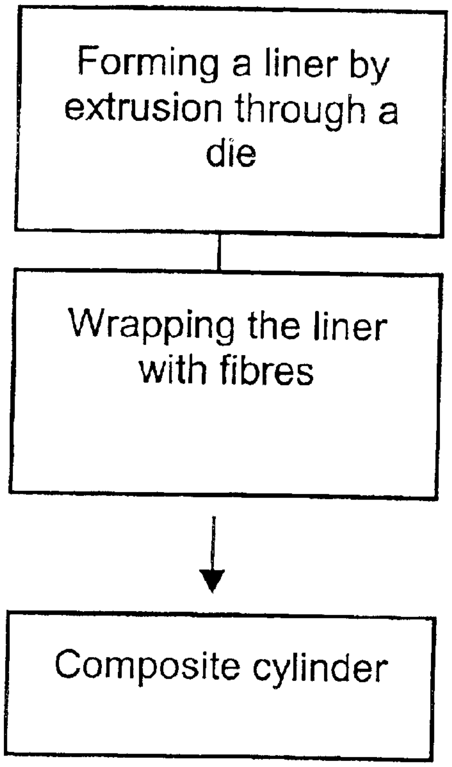
FIG. 1 is a block diagram of the manufacturing steps for making a composite cylinder.
Figure 2:
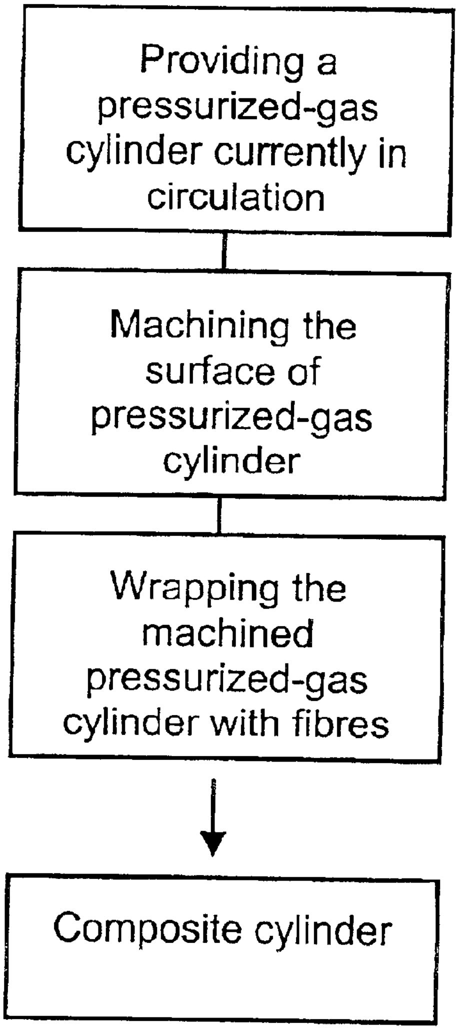
FIG. 2 is a block diagram for making a composite cylinder in accordance with the invention.

It has surprisingly been found that, by means of the utilization according to the invention of a pressurized-gas known per se, preferably a steel pressurized-gas cylinder for compressed, liquefied or dissolved gases, as a liner for a composite gas cylinder, the costs of production of the composite gas cylinder can be decreased by approximately ⅓. The pressurized-gas cylinder known per se has a gas capacity of 1 to 150 liters at a filling pressure of 150 to 200 bar. With use of the process, many pressurized-gas cylinders currently in circulation can be reused, which would otherwise have to be disposed of, that is to say scrapped. This saves resources and reduces emissions, since fewer pressurized-gas cylinders have to be produced.

The pressurized-gas cylinder known per se, as used by the gas producers for transporting gases and gas mixtures in liquid or dissolved form, only needs to be reduced in its wall thickness over an important part of its length, in order to be suitable as a liner for a composite gas cylinder for a filling pressure of 300 bar. In this case, the important part of its length is made cylindrical, which makes machining possible simply. Machining is essentially taken to mean the fabrication processes turning, planing, milling and grinding. Other fabrication processes, in particular reshaping by drawing or pressing, are not excluded b the invention.

A particularly simple process for producing the liner is that the wall thickness of the cylindrical part of the pressurized-gas cylinder known per se is determined by a sensor and fed to a controller of a tool as an actual value. The actual value determined by the sensor is used as a control signal. A cutting tool is moved along the cylindrical part as a function of the actual signal and a preset wall thickness signal. The tool decreases the wall thickness of the pressurized-gas cylinder known per se on the cylindrical part, until the preset value determined by calculation as a function of the pressurized-gas cylinder material is reached.

The use of a pressurized-gas cylinder known per se which is used as a liner without decrease in wall thickness and whose surface is cleaned by sandblasting advantageously leads to composite gas cylinders having a filling pressure of >300 bar, that is approximately 470 bar in the case of a 200 bar steel pressurized-gas cylinder known per se. This steel pressurized-gas cylinder known per se has a bursting pressure of approximately 600 bar. In this case, the bursting pressure of the unwrapped liner is equal to or greater than 85% of the test pressure of the wrapped composite cylinder.

This implies a test pressure of 600 bar/0.85=705 bar. The filling pressure of the composite cylinder is calculated from test pressure/1.5=approximately 470 bar.

The pressurized-gas cylinder known per se consists of the materials plastic, steel, stainless steel or aluminum.

What is claimed is:

1. A process for producing a composite gas cylinder for a higher filling pressure comprising obtaining a pre-existing preformed second-hand pressurized gas cylinder for compressed, liquefied or dissolved gases, with a lower filling pressure, and wrapping composite fibers over a substantial length of the pre-existing gas cylinder to convert the pre-existing cylinder into an inner liner and to thereby form the composite gas cylinder from the inner liner and the outer composite fiber wrapping.

2. A process according to claim 1, characterized in that the liner had been previously used as a pressurized gas cylinder containing compressed, liquefied or dissolved gases.

3. A process according to claim 1, wherein at least 85% of the pressure resistance is from the liner.

4. A process according to claim 1, characterized in applying a treatment selected from the group consisting of surface treating and machining to a substantial part of the length of the pre-existing cylinder to reduce its wall thickness.

5. A process according to claim 4, characterized in that the pre-existing cylinder was previously used at a filling pressure of 150 bar to 200 bar.

6. A process according to claim 5, characterized in that the higher filling pressure is about 300 bar.

7. A process according to claim 1, characterized in that the pre-existing cylinder was previously used at a filling pressure of 150 bar to 200 bar.

8. A process according to claim 7, characterized in that the higher filling pressure is about 300 bar.

9. A process according to claim 1, characterized in that the higher filling pressure is about 300 bar.

10. A process according to claim 1, characterized in that the liner is a seamless metal liner which is vacuum tight.

11. A process according to claim 1, characterized in that most of the pressure resistance of the composite cylinder is from the liner.

* * * * *